United States Patent

[11] 3,630,173

[72] Inventor Oleg Grigorievich Lunin
Zeleny prospekt, 10/32, Korpus 27, kv. 17, Moscow, U.S.S.R.
[21] Appl. No. 875,123
[22] Filed Nov. 10, 1969
[45] Patented Dec. 28, 1971

[54] APPARATUS FOR COVERING THE SIDE FACES OF A PARTIALLY FINISHED CAKE WITH CRUMBLINGS
7 Claims, 3 Drawing Figs.

[52] U.S. Cl. .................................................. 118/16
[51] Int. Cl. .................................................. A23g 3/20, 107 27;54
[50] Field of Search .................................... 118/13, 16

[56] References Cited
UNITED STATES PATENTS
2,674,223  4/1954  King .............................. 118/16
2,995,107  8/1961  Archer .......................... 118/16

Primary Examiner—Louis K. Rimrodt
Attorney—Waters, Roditi, Schwartz & Nissen

ABSTRACT: A device for covering the side faces of partially finished cakes with crumblings, used in installations for making multilayer cakes, comprises a lifting-and-lowering table, a hopper with a vibrating hopper and two boxes. The boxes are somewhat spaced from each other and have inlets and outlets in the walls of the boxes. When the boxes are in operating position the outlets for the crumblings are to the side face of the cake.

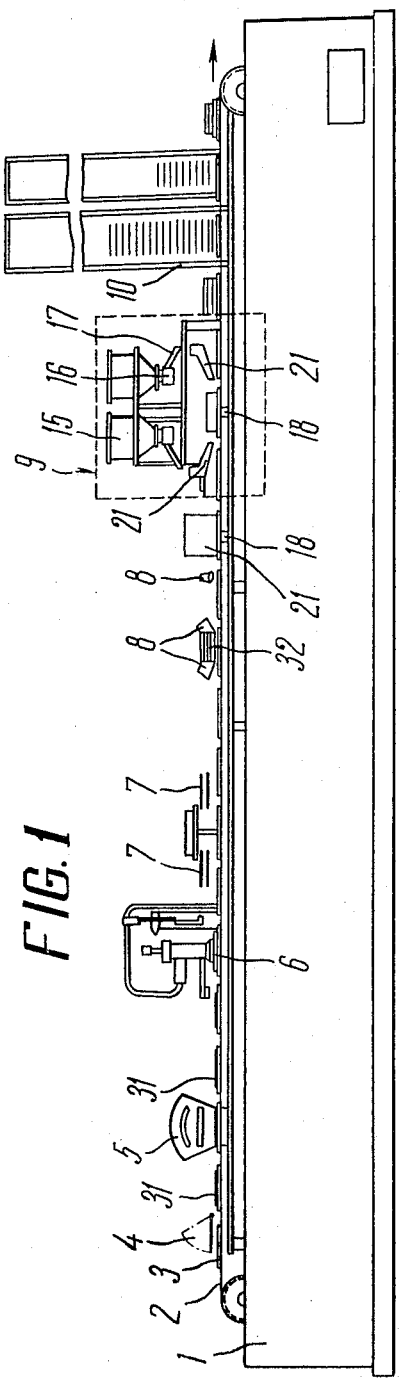
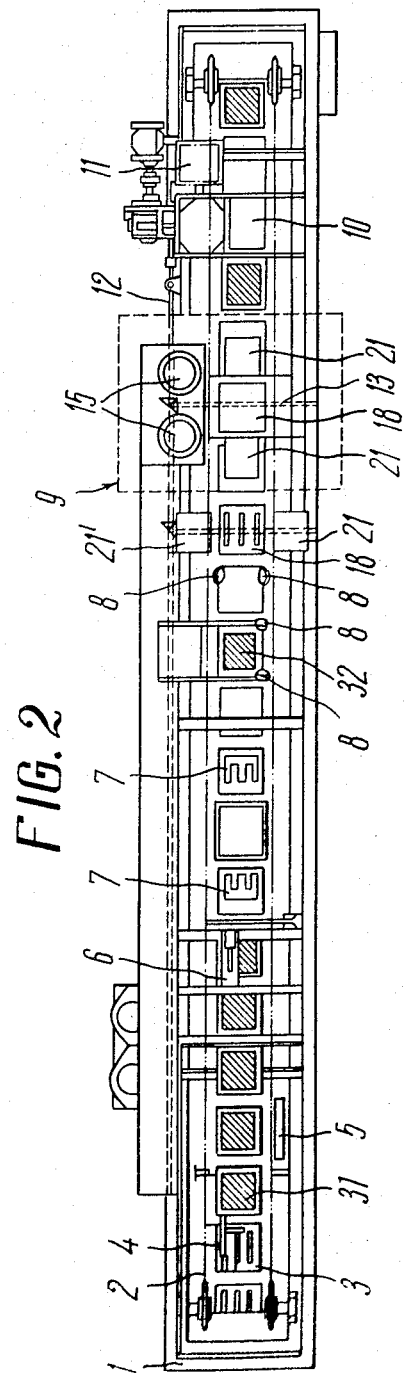

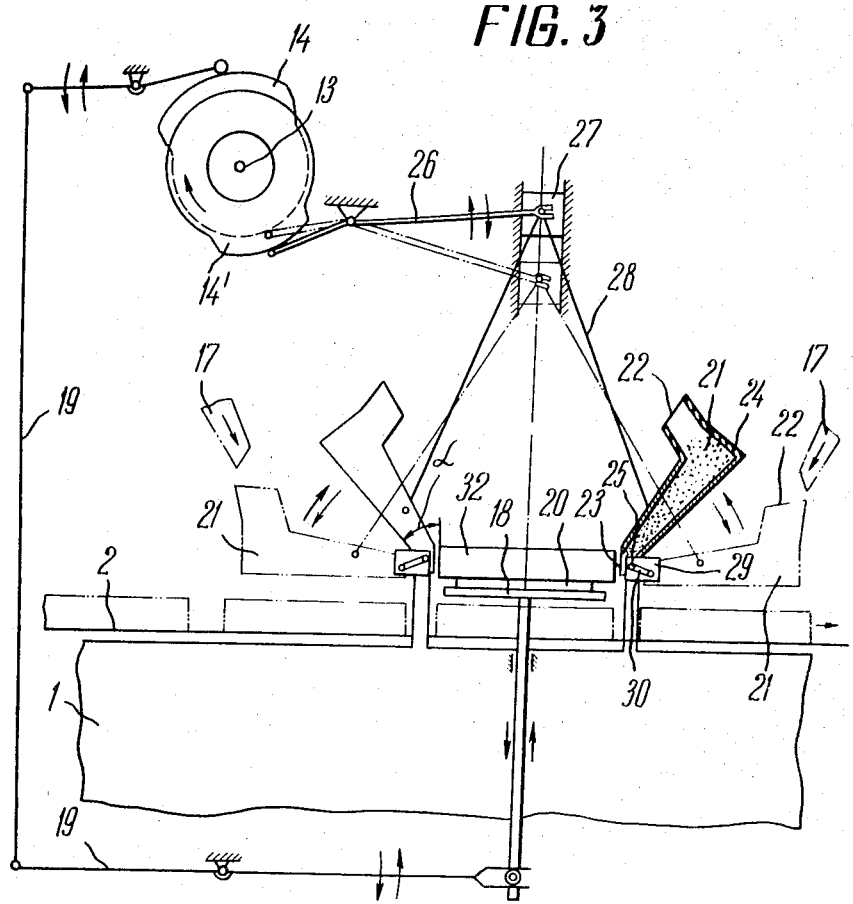

APPARATUS FOR COVERING THE SIDE FACES OF A PARTIALLY FINISHED CAKE WITH CRUMBLINGS

The present invention relates to an installation for making multilayer cakes and, more particularly, to devices for covering the side faces of a partially-finished cake with crumblings, used in such installations.

Known in the prior art is a device for covering the side faces of a partially-finished cake with crumblings for use in installations making multilayer cakes, which comprises a lifting-and-lowering table disposed under the conveyor of the installation and operatively coupled to the drive thereof, and a hopper for crumblings and a vibrating hopper with ports, mounted under the conveyor and having an arrangement for supplying crumblings to the side faces of a cake, disposed thereunder.

In the known device, the arrangement used for supplying crumblings to the side faces of a cake are comprised of two ejectors mounted under the ports of the vibrating hopper and each connected by means of flexible hoses to a cap secured on a slide block and moving along the cake.

This structural embodiment of an arrangement for supplying crumblings to the side faces of a partially finished cake provides for a uniform layer of only those crumblings that have been preliminarily crushed and dried.

It is an object of the present invention to eliminate the aforementioned disadvantages.

The present invention has for its object the provision of such a device for covering the side faces of a cake with crumblings, which well make it possible to use crumblings of any size and with any moisture content.

This object is accomplished in that in the device for covering the side faces of a cake with crumblings, comprising a lifting-and-lowering table disposed under the conveyor of the installation and operatively connected with the drive thereof, and a hopper for crumblings and a vibrating hopper with ports, mounted under the conveyor and having an arrangement for supplying crumblings to the side faces of a half-finished cake, disposed thereunder, in accordance with the invention, the arrangement for supplying crumblings comprises two boxes, mounted on the installation and somewhat spaced from each other to accommodate a cake therebetween and having an inlet and an outlet, the boxes having walls provided with outlets which are parallel to the side face of the cake in the operating position.

It is expedient to dispose the box wall provided with an outlet relative to the box bottom at a smaller angle than the angle of friction between crumblings and the surface of the bottom, which makes it possible to cover the side faces of a cake with crumblings of any size and provides for a reliable adhesion between the latter and the pastry mass layer.

The boxes may be mounted in the installation with a capability of turning in a vertical plane relative to an axle secured on each box near the outlet, the boxes being turned relative to the axle by a lever-and-cam gear assembly connected to the drive of the conveyor and through the intermediary of a slide block and rods to the boxes. To make it possible for the boxes to approach the cake in the course of their turning, it is expedient to provide on the installation frame a pair of guide cheeks for each box fixedly mounted and having inclined slots for the travel of the boxes therein.

To cover the two other faces of a cake with crumblings, the installation may be equipped with two additional boxes mounted therein perpendicular to the first two boxes in the direction of travel of the cakes.

The side faces of a cake may be covered with crumblings solely by means of two boxes as well, for which purpose the lifting-and-lowering table is made turnable.

Thus, the employment of the present invention in installations used for making multilayer cakes makes it possible to cover the side faces of a cake with a solid and tight layer of crumblings of any size and having any moisture content, which provides for a pleasing appearance of the finished cake.

The following description of an exemplary embodiment of the present invention is given with reference to the accompanying drawings, in which:

FIG. 1 is a side elevation view of the installation for making multilayer cakes;

FIG. 2 is a, top view thereof;

FIG. 3 diagrammatically shows elevation the device for covering the side faces of a half-finished cake with crumblings according to the invention.

The plant for making multilayer cakes comprises the following members frame 1 (FIGS. 1 and 2): a periodically actuated chain conveyor 2 carrying plates 3 with slots, and a guiding mechanism 4, a mechanism 5 for weighing an cake block while it is being impregnated with syrup, a mechanism 6 for covering the face of the initial cake block with a pastry mass, for example, cream, a mechanism 7 for forming from the cake block partially finished multilayer layer cakes, a mechanism 8 for distributing cream the partially finished cake with the side faces of the partially finished cake, a device 9 for covering the side faces of the partially finished cake with crumblings, and a mechanism 10 for placing the partially finished cakes into boxes, all mounted above said chain conveyor 2 and successively disposed in the direction of the technological process.

All the aforementioned mechanisms 4–8 and 10, as well as the device 9 for covering the cake side faces with crumblings, are driven by a drive 11 (FIG. 2) of the conveyor 2 through the intermediary of a distribution shaft 12 disposed along the whole length of the installation.

The device 9 for covering the cake side faces with crumblings is driven by the distribution shaft 12 through the intermediary of a cam shaft 13 having cams 14 and 14' (FIG. 3), disposed perpendicular with respect to the distribution shaft 12 (FIG. 2) and coupled therewith through bevel gears.

The device 9 for covering the cake side faces with crumblings comprises a hopper 15 and a vibrating hopper 16 with two ports 17, mounted above the conveyor 2, and a lifting-and-lowering table 18 disposed under the plates 3 of the conveyor 2 and operatively coupled with the distribution shaft 12 (FIG. 2) through the intermediary of a linkage 19 (FIG. 3), cam 14 and cam shaft 13.

The lifting-and-lowering table 18 (FIG. 3) has projections 20 entering slots in the plates 3 in the course of lifting the table 18 and raising of the cake above the conveyor 2.

Mounted under the ports 17 (FIG. 1) of the vibrating hopper 16 is an arrangement for supplying crumblings to the side faces of the cake, which essentially comprises two boxes 21 somewhat spaced from each other to accommodate a cake therebetween. Each box 21 has an inlet 22 (FIG. 3) through which crumblings are supplied from the port 17, and an outlet 23 through which crumblings are poured on the side face of the cake.

To provide for an equal amount of crumblings uniformly poured on the side faces of the cake, when the boxes 21 are in the working position, the box walls provided with the outlets 23 are disposed parallel to the side face of the cake. In addition, these walls are disposed relative to the bottom 24 of the box at an angle $\alpha$ which is smaller than the angle of friction between the crumblings and the surface of the bottom, which makes it possible to press the crumblings into the side faces of the cake without employing any additional means.

To make the crumblings which are poured through the outlets 23 of the boxes 21, simultaneously cover the entire side face of the cake, the boxes 21 are turnable in a vertical plane relative to an axle 25 secured on each box near the outlet 23.

The boxes 21 are turned in the vertical plane relative to the axle 25 by means of a lever-and-cam gear arrangement comprising cam shaft 13 and a double-arm lever 26, one of the arms of said lever interacting with cam 14' of the shaft 13 and the other arm being coupled with a slide block 27 which, in turn, is connected to the boxes 21 by means of rods 28. To make the boxes 21, in the course of turning thereof, approach the half-finished cake, stationary mounted on the frame 1 for each box are a pair of guide cheeks 29 having inclined slots 30 for the travel of the axles 25 therein.

The two other side faces of the half-finished cake are covered with crumblings by means of an additional pair of boxes mounted in the installation in the direction of the cake perpendicular to the first two boxes. Alternatively the lifting-and-lowering table 18 may be made turnable about its axle.

With the table 18 is made turnable, all the side faces of the half-finished cake are covered with crumblings by means of one pair of boxes.

Any conventional means may be employed for turning the table 18 and, therefore, such is not described herein.

The proposed device operates as follows.

A sponge cake preliminary baked and cut into pieces 31 (FIG. 1) of a square shape is placed on the plates 3 of the conveyor 2 in the guiding mechanism 4. Then the drive 11 is started and the conveyor 2 moves the pieces 31, periodically stopping under the mechanisms 5, 6, 7, 8.

During these stops every piece 31 is successively treated by said mechanisms, as a result of which a part-finished sponge cake 32 formed from the pieces 31, having its side faces covered with cream and consisting of two or three sponge layers, each being impregnated with syrup and having cream on its top, is delivered to the device 9 for covering the cake side faces with crumblings.

After the conveyor 2, whose plate 3 bears the formed half-finished sponge cake 32 (FIG. 3), has come to a stop, the lifting-and-lowering table 18 moves upwardly under the action of the cam 14 and levers 19 and its projections 20 enter the slots of the plate 3 and raise the cake to the level of the boxes 21 (the initial position of the boxes is shown in FIG. 3 by a chain dotted line) containing the crumblings supplied from the ports 17 from the vibrating hopper 16 and hopper 15.

Thereupon, the cam 14' of the shaft 13 lowers one arm of the lever 26, whereas the other arm displaces the slide block 27 and the rods 28, the latter bringing the boxes 21 into their operating position (shown in FIG. 3 in solid lines).

Concurrently, the axles 25 of the boxes 21 slide in the inclined grooves 30 of the guide cheeks 29, whereupon the outlet 23 approaches and almost contacts the side face of the cake 32. With the boxes 21 in the operating position, their walls provided with the outlets 23 take a position parallel to the side face of the half-fininshed cake 31. The angle $\alpha$ between the box bottom 24 and its wall provided with the outlet 23 being smaller than the angle of friction between crumblings and the surface of the box bottom, the crumblings move down and are pressed between the bottom of the box and the cake side face, thus being pressed into the cream covering the side faces of the sponge cake.

Thereupon, the cam 14' raises the arm of the lever 26 and the other arm moves the slide block 27 in the opposite direction, as a result of which the rods 28 of said slide block 27 return the boxes 21 to their initial positions. In the course of their turning, the boxes 21 move away from the cake 32 and the lifting-and-lowering table 18 moves down.

The sponge cake thus obtained is placed into a box which is then removed from the conveyor for the subsequent operation of decoration of the top face of the partially finished cake in an appropriate manner.

In the event that there is no cake on the plate of the conveyor, the boxes 21 are prevented from turning by means of an electric feeler mounted on the lifting-and-lowering table 18, which senses the presence of a cake on the said table.

What is claimed is:

1. Apparatus for covering the side faces of a cake, said apparatus comprising conveyor means for transporting a cake through a series of stages where the cake is preliminarily treated and covered with a pastry mass, a vertically movable table disposed below the conveyor means and operated in synchronization therewith to periodically lift the cake above the conveyor means, a hopper mounted above said conveyor means for receiving crumblings to be applied to side faces of the cake, means for vibrating crumblings leaving said hopper, two boxes disposed beneath the latter means for receiving crumblings therefrom, said boxes being spaced to accommodate a cake therebetween, means supporting each box for pivotal movement in a vertical plane, operating means for moving each box between a first position in which crumblings are received in the box, and a second position in which the box is tilted upwardly to an operative position and crumblings are applied to the side faces of the cake, each box having an outlet facing a side face of the cake and inclined with respect to the vertical in said first position, said outlet assuming a position parallel to the side face of the cake and at the lower end of the box when the box is tilted upwardly to said second position whereupon the crumblings can flow by gravity to the side faces to become pressed into the pastry mass.

2. Apparatus as claimed in claim 1 wherein each said box includes a bottom wall and said outlet lies in a plane which is inclined with said respect to said bottom wall at an angle smaller than the angle of friction between crumblings and said bottom wall.

3. Apparatus as claimed in claim 1 wherein the support means supporting each box includes means to enable the box to approach the cake when the box moves from said first to said second position and to move away from the cake when the box moves from said second position back to said first position.

4. Apparatus as claimed in claim 3 wherein said support means comprises a pivot axle for each box around which said box is tilted, the means which enables the box to travel towards and away from the cake comprising a stationary support member having a slot in which said axle is displaceable.

5. Apparatus as claimed in claim 4 wherein said slot in inclined with respect to the horizontal.

6. Apparatus as claimed in claim 5 wherein said operating means comprises a rotatable cam driven in synchronization with said conveyor means, and means operatively connecting said cam and said boxes to tilt the latter about the axles between said first and second positions as said cam undergoes rotation.

7. Apparatus as claimed in claim 1, wherein said side faces of the cake are rectilinear, said table being rotatable stepwise to bring said boxes into successive positions facing different side faces of the cake.

* * * * *